United States Patent
Durnholz et al.

(10) Patent No.: US 6,336,438 B1
(45) Date of Patent: Jan. 8, 2002

(54) DIRECT INJECTION DIESEL MOTOR WITH TUMBLE-SUPPORTED COMBUSTION PROCESS

(75) Inventors: Manfred Durnholz, Heinsberg; Michael Kruger, Aachen; Rainer Kwasny, Aachen; Frank Wunderlich, Aachen, all of (DE)

(73) Assignee: Fev Motorentechnik GmbH, Aachen (DE)

( * ) Notice: Subject to any disclaimer, the term of this patent is extended or adjusted under 35 U.S.C. 154(b) by 0 days.

(21) Appl. No.: 09/486,069
(22) PCT Filed: Jun. 7, 1999
(86) PCT No.: PCT/EP99/03902
§ 371 Date: Feb. 22, 2000
§ 102(e) Date: Feb. 22, 2000
(87) PCT Pub. No.: WO99/67515
PCT Pub. Date: Dec. 29, 1999

(30) Foreign Application Priority Data

Jun. 19, 1998 (DE) .......................... 198 27 463

(51) Int. Cl.⁷ ............................... F02B 31/08
(52) U.S. Cl. ..................................... 123/301
(58) Field of Search ................ 123/301, 298, 123/295, 305, 302, 308

(56) References Cited

U.S. PATENT DOCUMENTS

| | | | |
|---|---|---|---|
| 5,285,755 A | | 2/1994 | Regueiro .................. 123/193.6 |
| 5,669,345 A | * | 9/1997 | Lee ........................ 123/184.42 |
| 5,711,269 A | * | 1/1998 | Oda et al. .................... 123/262 |
| 5,727,520 A | * | 3/1998 | Wirth et al. ................. 123/305 |
| 5,873,344 A | * | 2/1999 | Kudou et al. ................ 123/295 |
| 5,921,215 A | * | 7/1999 | Wirth et al. ................. 123/298 |
| 5,943,993 A | * | 8/1999 | Carstensen et al. ......... 123/298 |
| 6,047,592 A | * | 4/2000 | Wirth et al. ................... 73/116 |
| 6,129,065 A | * | 10/2000 | Ueda et al. .............. 723/193.6 |
| 6,138,639 A | * | 10/2000 | Hiraya et al. | |

FOREIGN PATENT DOCUMENTS

| | | | |
|---|---|---|---|
| EP | 0 634 571 | | 1/1995 |
| JP | 04311624 | | 11/1992 |
| JP | 6-272563 | * | 9/1994 |

* cited by examiner

Primary Examiner—Tony M. Argenbright
Assistant Examiner—Hieu T. Vo
(74) Attorney, Agent, or Firm—Venable; Gabor J. Kelemen

(57) ABSTRACT

The process relates to a diesel engine, the individual cylinders (1) of which are respectively provided with a fuel injection device, having an injector (21) that discharges into the combustion chamber (2) of the cylinder (1), said cylinders comprising at least one discharge valve (9) and at least one admission valve (7) for each cylinder, to which are assigned respectively extending admission channels (6, 8) in the cylinder head (3), which channels empty at a slant into the combustion chamber (2), wherein the combustion chamber (2) of a cylinder (1) that is limited by the cylinder head (3) on the one side and the piston bottom (13) on the other side is designed such that the charge movement inside the combustion chamber (2) is a rotational movement around the cylinder axis (17), having a value $CU/CA \leq 0.5$ and a tumble movement around the lateral axis having a value of $CT/CA \geq 0.5$, and wherein the injector is provided with at least one injector opening.

14 Claims, 5 Drawing Sheets

DIRECT INJECTION DIESEL MOTOR WITH TUMBLE-SUPPORTED COMBUSTION PROCESS

DESCRIPTION

Figure 1:
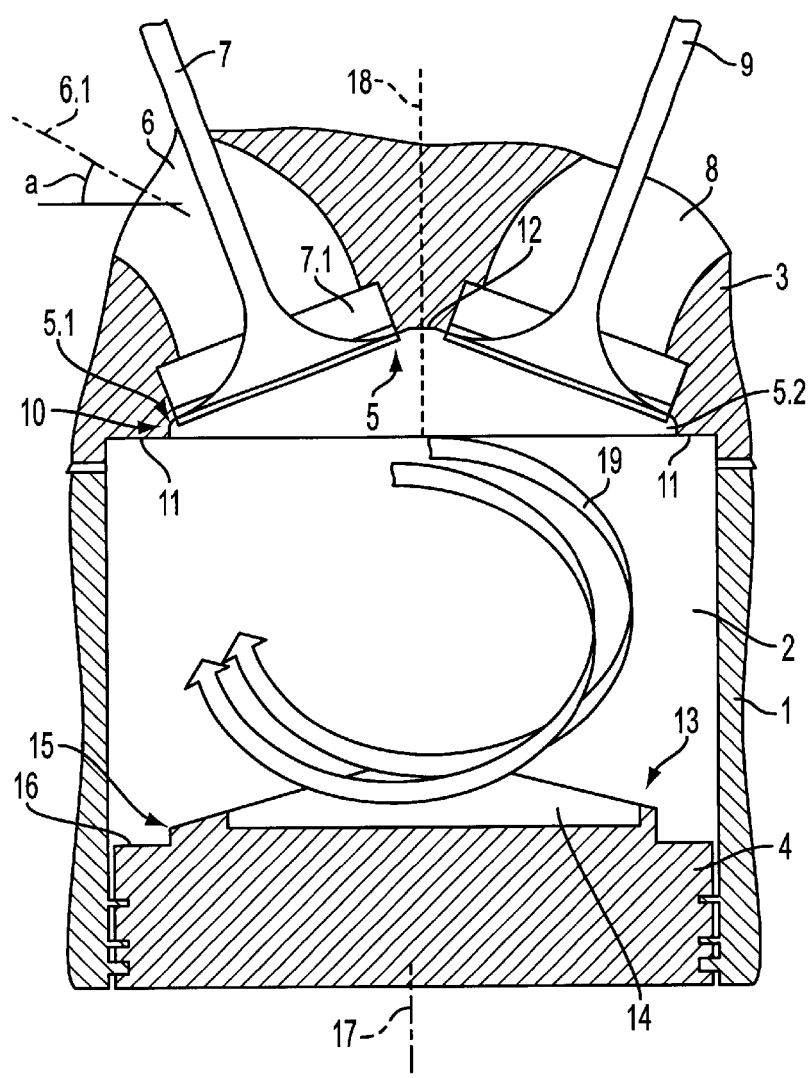

In addition to a reduction in the fuel consumption, direct-injection diesel engines must meet the requirement of a reduction in emissions. For this, it is very important to provide the longest possible, clear injection distance for the diesel fuel jet and to avoid, if possible, any fuel hitting the cylinder walls, so as to obtain the most uniform fuel-air-mixture.

For a proper processing of the mixture, European Patent A-0 634 572, for example, discloses that given an essentially level limiting surface of the combustion chamber near the cylinder head, the admission channels must be installed such that the air flowing into the cylinder will be provided with a strong rotational movement around the cylinder axis, which is still in effective during the injection of fuel. However, this can be achieved only with a geometrically complicated cylinder head.

German Patent A-4 241 104 discloses a diesel engine, for which the combustion chamber of the cylinder is offset, meaning it has two stages on the cylinder head side that are height-displaced relative to each other. In that case, the admission valve opens up into the surface of the upper stage and the discharge valve issues from the lower stage surface, respectively with the associated channels for conducting gas. The piston bottom has a corresponding design with stages. The respective transition region from one stage to the other is provided at the cylinder head as well as at the piston bottom with an undercut, so that an essentially cylindrical combustion chamber space forms if the piston is in the upper dead center position, which extends crosswise to the cylinder axis. The injector discharges in axial direction of the combustion chamber into this combustion chamber space, that is to say crosswise to the cylinder axis. This structural design also requires a complicated design for the cylinder head and a complicated piston design.

German Patent A-19 537 028 discloses a diesel engine that is modified relative to German Patent A-4 241 104. The admission valves for this engine are again arranged higher than the discharge valves, but the limiting surface of the combustion chamber on the cylinder-head side is slanted on the intake side, as compared to the cylinder axis, and extends horizontally on the discharge side. The associated piston bottom has a corresponding outline, wherein the essentially horizontal piston bottom surface that is coordinated with the discharge side extends into the intake region. Thus, a cylindrical combustion chamber space is created in the upper dead center position, which extends crosswise to the cylinder axis and into which fuel is injected crosswise to the cylinder axis. This combustion chamber design also requires geometrically complicated cylinder heads and pistons with a fissured piston bottom design.

Thus, it is the object of the invention to create a direct-injection diesel engine, effecting a diesel combustion method that permits high center pressures with a very favorable fuel consumption and low emissions, owing to its combustion chamber design.

This object is solved with a diesel engine having individual cylinders that are respectively provided with a fuel injection device, for which the injector discharges into the combustion chamber of the cylinder, said cylinders having at least one discharge valve and at least one admission valve for each cylinder, to which are assigned respectively extending channels in the cylinder head. These channels empty at a slant into the combustion chamber, wherein the combustion chamber is limited by the cylinder head on one side and the piston bottom on the other side and is designed such that the charge movement inside the combustion chamber is a rotational movement around the cylinder axis, with a value of $CU/CA \leq 0.5$ and a tumble movement around the lateral axis with a value of $CT/CA \geq 0.5$, wherein the injector is provided with at least one injection opening. CU refers to the circumferential speed component for a rotational flow and CA correspondingly refers to the axial speed component, so that the ratio CU/CA represents a measure for the intensity of a rotational flow. Analogous to the rotational flow, CT provides the tangential speed component of the tumble or roll turbulence, whereas CA reflects the axial speed component. The ratio CT/CA represents the measure for the intensity of the tumble flow. The device described in German Patent A-41 33 277, for example, can be used for measuring the tumble flow.

By designing the combustion chamber in this way, together with a separation of the fuel to be injected into a plurality of individual jets, it is possible to produce an optimum mixture inside the combustion chamber, resulting for the most part in a homogeneous fuel-air-mixture. It is particularly useful in this connection if the fuel is injected into the combustion chamber with an extremely high pressure, such as can be realized with the aid of so-called common-rail injection systems and pressures exceeding 1000 bar. In particular the intake configuration is embodied with two essentially parallel extending admission channels that discharge at a slant into the combustion chamber, so that the homogeneous mixture for a direct-injection diesel engine is achieved through a so-called tumble movement. The combustion chamber limiting surface on the cylinder head side can have a level design, at least in part, such as is known from classic diesel engine designs. The achieved, induced center pressures are in the range of 12 to 14 bar for a rotational speed of 1500 RPM, for example, and in the range of 15 to 18 bar for 2000 RPM, as well as in the range of 10 to 13 bar for 4000 RPM.

One embodiment of the invention provides that the combustion chamber limiting surface on the cylinder-head side has a roof-shaped design, at least in its essential region, wherein at least one admission channel feeds into one roof surface and at least one discharge channel issues from the other roof surface. It is particularly favorable in this case if the roof-shaped limiting region is respectively level in the area adjacent to the "eaves region" of the roof. The piston bottom is designed to match the combustion chamber limiting surface on the cylinder-head side. It has turned out that this combustion chamber design, which is derived from Otto engines and adapted to the diesel method, also results in excellent values for the diesel method with respect to output, fuel consumption and low emissions, provided the aforementioned conditions of $CU/CA \leq 0.5$ and $CT/CA \geq 0.5$ are observed for the charge movement.

One advantageous embodiment of the invention furthermore provides that the piston bottom contains an indentation, preferably a pot-shaped indentation. For this, it is useful if the indentation has an essentially circular-cylindrical shape and a level bottom surface. With a partially roof-shaped piston bottom design, the indentation is arranged in the region of the cylinder axis, so that only the remaining outer edge regions have a roof-shaped design. A level limiting surface toward the cylinder wall is provided adjacent to the "eaves region" of the roof, in accordance with the outline of the limiting surface on the cylinder head side.

One advantageous embodiment of the invention provides that the vertical axis of the indentation coincides with the vertical axis of the injection device, wherein it is particularly advantageous that the vertical axis of the injection device is arranged at a distance and offset in the direction of the discharge valve.

Figure 7:
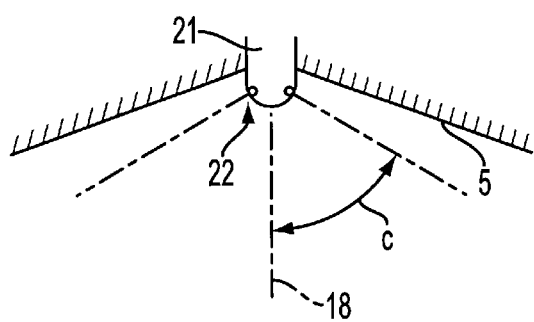
Figure 2:
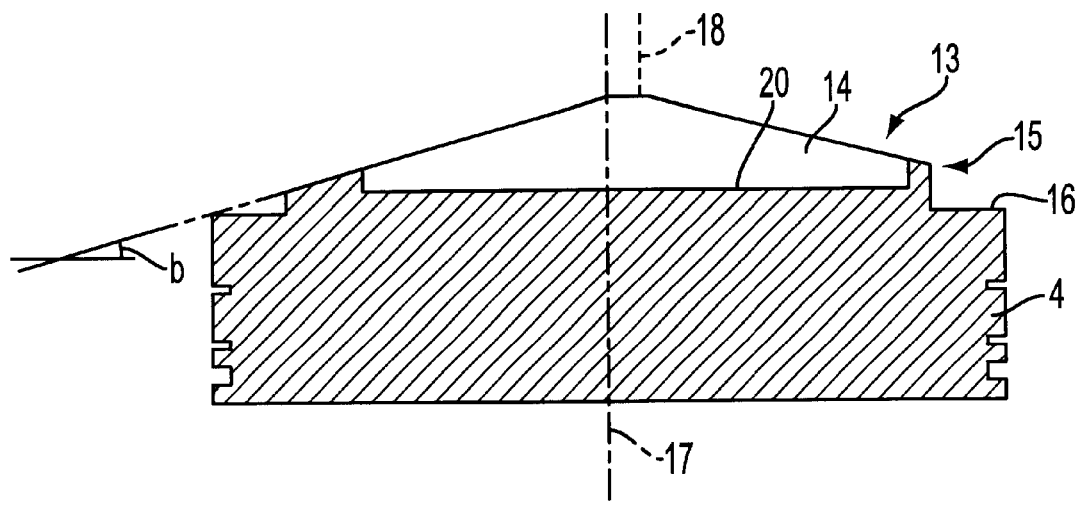
Figure 3:
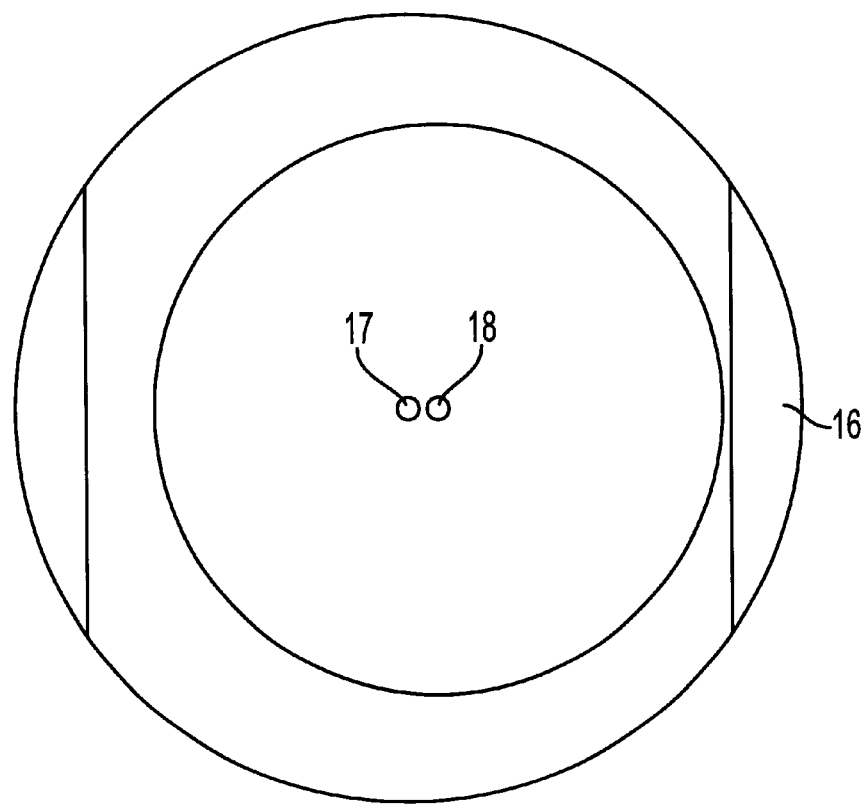
Figure 5:
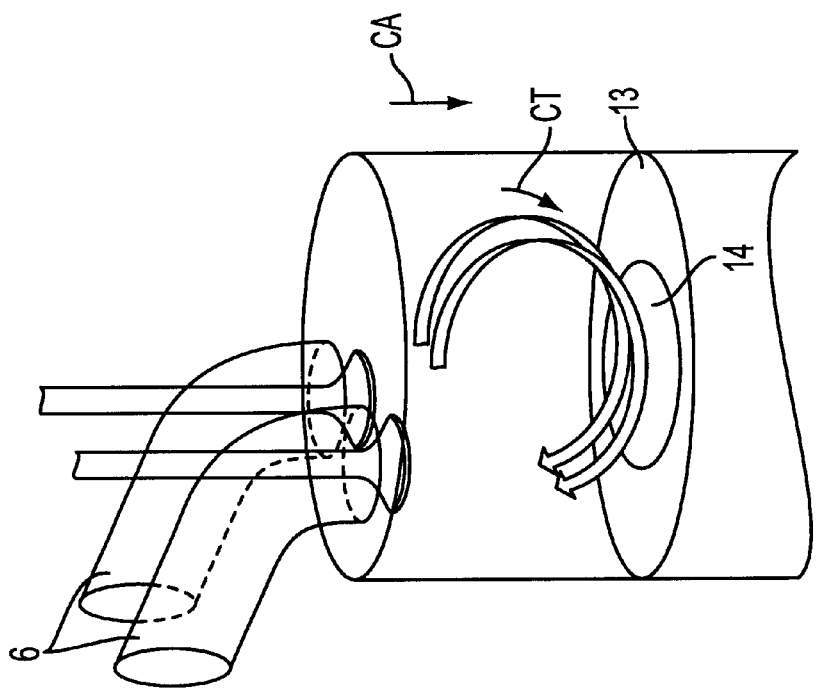
Figure 4:
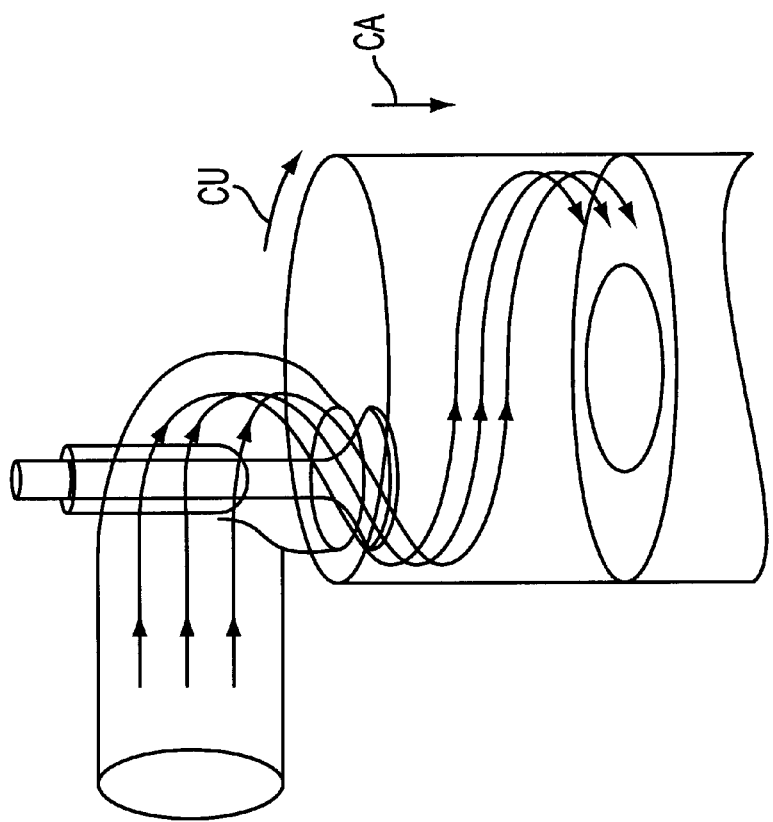
Figure 6:
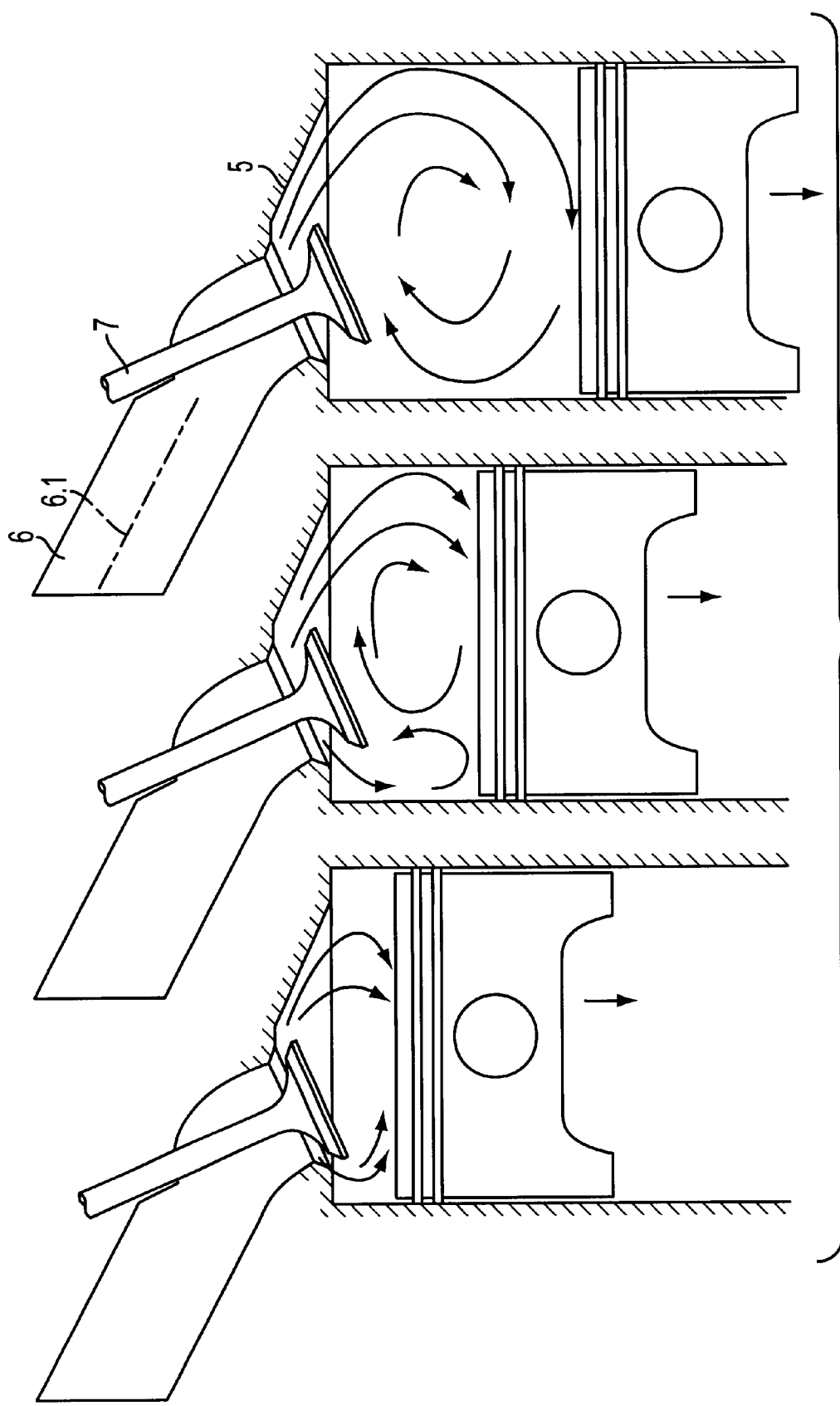
Figure 8:
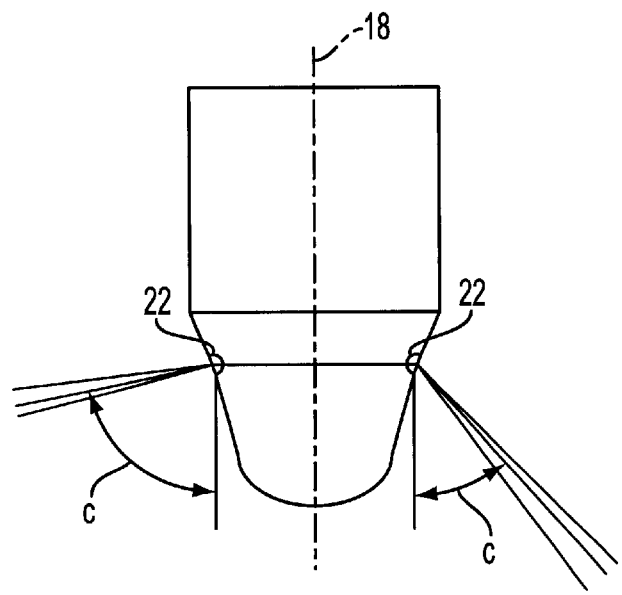
Figure 9:
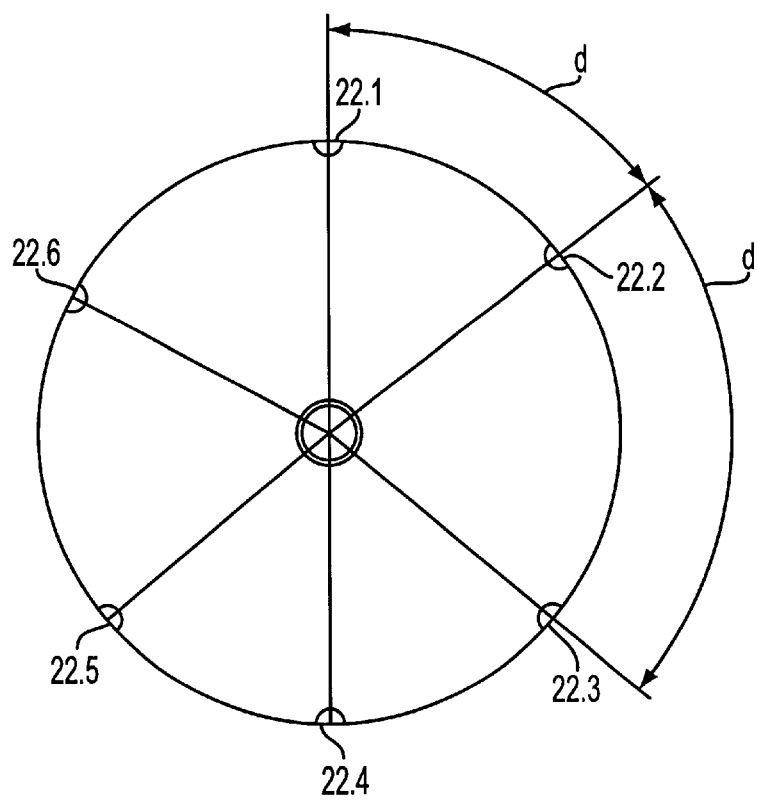

The invention is explained in further detail with the aid of schematic drawings of exemplary embodiments, showing in:

FIG. 1 a vertical section through a cylinder;

FIG. 2 a vertical section through the upper region of a piston, along the cylinder axis;

FIG. 3 an associated view from above of the piston according to FIG. 2;

FIG. 4 a rotational flow that has formed at the end of the intake phase;

FIG. 5 a tumble flow that has formed;

FIG. 6 schematically the development of a tumble flow in the intake phase;

FIG. 7 the arrangement of injector openings for an injector;

FIG. 8 a modified arrangement for the injector openings;

FIG. 9 an arrangement of injector openings where the openings are at different distances to each other.

FIG. 1 shows a vertical section of a cylinder 1 for a diesel engine, for which the combustion chamber 2 is limited by a cylinder head 3 on the one side and a piston 4 on the other side. The limiting surface 5 of combustion chamber 2 in the cylinder head 3 is designed in the shape of a roof for the exemplary embodiment shown herein, wherein one or also two parallel extending admission channels 6 empty side-by-side into the one roof surface 5.1, which admission channels can respectively be closed off by an admission valve 7. One or two parallel discharge channels 8 issue from the other roof surface 5.2 and can be closed off respectively by a discharge valve 9. In the "eaves region" 10 of the two roof surfaces 5.1 and 5.2, the limiting surface on the cylinder-head side changes to a level edge surface 11 for the exemplary embodiment shown herein, which extends parallel to the ridge line 12 of the limiting surface 5. However, it is also possible to have an embodiment for which the roof surfaces at the combustion chamber top as well as at the piston bottom are formed such that they are tapered toward the cylinder walls.

The angle between admission valve 7 and discharge valve 9 can measure up to 40°, wherein the bisecting line of the angle can be slanted by up to 8°, relative to the cylinder axis 17.

The sectional view shown in FIG. 1 is offset in the cylinder head region 3, as a result of axis 6.1 for an admission channel 6 and the associated discharge channel 8. In the region of combustion chamber 2, up to and including the piston, the section extends in one plane along the cylinder axis 17.

The piston bottom 13 of piston 4 for the exemplary embodiment shown in FIG. 1 is essentially realized to match the shape of the limiting surface 5 on the cylinder-head side, with the exception that a pot-shaped indentation 14 is worked into the roof surface of piston bottom 13, as can be seen in FIG. 3. Respectively in the "eaves region" 10 of the roof outline, the piston bottom 13 is provided with horizontal surfaces 16 that match the limiting surfaces on the cylinder-head side. An injection device is arranged in the cylinder head 3, in the region of cylinder axis 17, which is indicated herein only by its axis 18. With the exemplary embodiment shown herein, the injection axis 18 is arranged offset by a small measure in the direction toward the discharge channels 8. However, it can also coincide with the cylinder axis 17. Depending on the design and alignment of the injectors, the injection axis can be arranged at a slant of up to 30° relative to the cylinder axis 17.

FIG. 1 shows the piston 4 during its downward movement, while the admission valves 7 are opened. As a result of the combustion chamber configuration and the parallel admission channels 6, which essentially empty at an angle $\alpha$ into the combustion chamber 2, a tumble flow forms in the combustion chamber 2 that is indicated with the two double arrows 19. This tumble flow is for the most part also maintained during the compression phase, meaning while the admission valves 7 are closed and the piston 4 is moving upward. The fuel is then injected just prior to the end of the compression lift directly into the combustion chamber 2 and into this tumble flow, which rotates around a lateral axis that extends perpendicular to the cylinder axis 17. Since the injector contains at least five injector openings, the necessary fuel amount is injected finely distributed into this tumble flow, so that the fuel can travel a long distance without making contact with the cylinder wall and, in the process, a homogeneous mixture can form in the combustion chamber.

The tumble flow, which is for the most part generated by the geometry of the admission channels, is essentially stabilized by the geometry of the combustion chamber 2, in particular the shape of the limiting surfaces of the roof on the cylinder-head side and the associated shape of the piston bottom 13 during the compression operation. The indentation 14 in the piston bottom 13 in this case ensures the desired long distances for the injected fuel amounts, in addition to also exerting a stabilizing effect on the tumble. The ratio of indentation diameter to piston diameter should advantageously be 0.5 to 1.0.

The piston bottom for a modified version can be designed in the shape of a roof and without indentation, as well as with an optional flattened section in the ridge region. A totally flat piston bottom, as shown in FIG. 6, is also conceivable.

The aforementioned asymmetric design of the combustion chamber can be seen in the sectional view as well as the view from above of the piston bottom embodied in FIGS. 2 and 3. By assigning the reference numbers of the individual features previously explained in connection with FIG. 1, it is possible to refer to the preceding description.

FIGS. 2 and 3 show that the pot-shaped indentation 14 in the piston bottom 13 is essentially circular-cylindrical and has a level bottom surface 20.

Relative to the horizontal line, the angle of inclination b for the roof-shaped limiting surface is between 13° and 18° and preferably approximately 15°, as measured on the side of the cylinder head as well as on the side of the piston bottom. In the region directly in front of the curved transition to the intake opening 7.1, which can be closed off with the admission valve 7, the admission channels 6 are inclined with their center axis 6.1 by an angle $\alpha$ of between 15° and 45°, preferably about 30°, relative to the horizontal line.

For a better understanding of the flow conditions, FIG. 4 shows a rotational flow that has formed at the end of an intake phase. The associated speed components CU and CA are respectively marked with arrows.

FIG. 5 shows a tumble flow that has formed for the same piston position. The speed components CT and CA in this case are also marked correspondingly with arrows. FIG. 5 demonstrates that the arrangement of indentation 14 in the piston bottom 13 contributes considerably to maintaining the tumble flow during the subsequent upward movement of the piston 4 in the compression phase. Thus, a sufficient flow component CT is still present during the injection phase, which then ensures that a complete mixture is formed.

The individual steps from left to right in FIG. 6 show how during the intake phase, meaning when the piston moves downward, the initially axial inflow of air changes to a tumble flow during the further course of the intake phase until the end of the intake phase. This tumble flow is supported to a high degree by the geometric coordination between admission channels 6 and the cylinder chamber and also by the arrangement of a corresponding combustion chamber roof 5.

FIG. 7 contains a schematic drawing of injector 21 for the fuel injection device, which projects into the combustion chamber 2. As can be seen in the drawing, the injector 21 comprises a plurality of injector openings 22, but at least five. Relative to the injection axis 18, the injector openings are aligned such that the exiting, finely distributed fuel jets are discharged at an angle c of approximately 45 to 80° into the combustion chamber 2.

The above-presented and described combustion chamber design is know per se from Otto engines. Surprisingly, it has turned out that such a combustion chamber design can also meet the requirement for high center pressures with very favorable fuel consumption and low emissions, even for diesel combustion processes with direct injection. In addition, this involves production technological advantages since it is now possible to manufacture cylinder heads for Otto engines as well as for diesel engines on the same production lines.

The injection device can be provided with injectors, for which the design and arrangement of the openings vary. In addition to a so-called throttle injector with only one injector opening, injectors having at least three openings can also be used. The angle c of the individual injector openings 22, relative to the individual axes 18 of the injection device, as well as the angle d or the spacing of the individual injector openings 22 in circumferential direction can respectively be different. This is shown schematically in FIGS. 6 and 9 for a injector with six injector openings 22.1 to 22.6.

What is claimed is:

1. A diesel engine comprising a plurality of engine cylinders each having a cylinder axis; a cylinder head covering the engine cylinders; at least one intake port opening into each said cylinder at an oblique orientation to the cylinder axis; said intake port being provided in said cylinder head; a separate intake valve for opening and closing each said intake port; at least one exhaust port opening into each said cylinder; said exhaust port being provided in said cylinder head; an exhaust valve for opening and closing said exhaust port; a fuel injection nozzle opening into each cylinder and having a nozzle axis codirectional with said cylinder axis; said nozzle having a plurality of outlet openings oriented at an angle of between 60° and 80° to said nozzle axis; a piston received for reciprocation in each said cylinder and having a piston bottom; a combustion chamber defined in each said cylinder and being bordered by said cylinder head and said piston crown; said cylinder head having wall portions with planar parts oriented perpendicularly to said cylinder axis and bordering said combustion chamber; said cylinder head having further wall portions bordering said combustion chamber and being formed by a first and a second surface inclined towards one another in an inverted V-shaped configuration; said intake ports terminating in said first surface and said exhaust port terminating in said second surface; said piston bottom having an inverted V-shaped configuration complemental to the inverted V-shaped configuration of said cylinder head;

whereby a combustion charge introduced into said cylinder propagates as a twist flow about said cylinder axis and as a tumble flow about an axis transverse to said cylinder axis such that $CU/CA \leq 0.5$ and $CT/CA \geq 0.5$, wherein CU is the circumferential velocity component of said twist flow, CA is the axial velocity component of said twist flow and CT is the tangential velocity component of said tumble flow.

2. A diesel engine comprising
(a) a plurality of engine cylinders each having a cylinder axis;
(b) a cylinder head covering the engine cylinders;
(c) at least one intake port opening into each said cylinder at an oblique orientation to the cylinder axis; said intake port being provided in said cylinder head;
(d) a separate intake valve for opening and closing each said intake port;
(e) at least one exhaust port opening into each said cylinder; said exhaust port being provided in said cylinder head;
(f) an exhaust valve for opening and closing said exhaust port;
(g) a fuel injection nozzle opening into each cylinder; said nozzle having at least one outlet opening;
(h) a piston received for reciprocation in each said cylinder; said piston having a piston bottom;
(i) a combustion chamber defined in each said cylinder and being bordered by said cylinder head and said piston crown; said combustion chamber including means for effecting propagation of a combustion charge, introduced into said cylinder, as a twist flow about said cylinder axis and as a tumble flow about an axis transverse to said cylinder axis such that $CU/CA \leq 0.5$ and $CT/CA \geq 0.5$, wherein CU is the circumferential velocity component of said twist flow, CA is the axial velocity component of said twist flow and CT is the tangential velocity component of said tumble flow.

3. The diesel engine as defined in claim 2, wherein said fuel injection nozzle has a nozzle axis codirectional with said cylinder axis.

4. The diesel engine as defined in claim 3, wherein said fuel injection nozzle has more than one outlet opening; and further wherein said outlet openings of said nozzle are oriented at an angle of between 60° and 80° to said nozzle axis.

5. The diesel engine as defined in claim 2, wherein wall portions of said cylinder head bordering said combustion chamber have planar parts.

6. The diesel engine as defined in claim 5, wherein said planar parts are oriented perpendicularly to said cylinder axis.

7. The diesel engine as defined in claim 2, wherein wall portions of said cylinder head bordering said combustion chamber are formed by a first and a second surface inclined towards one another in an inverted V-shaped configuration; said intake ports terminating in said first surface and said exhaust port terminating in said second surface.

8. The diesel engine as defined in claim 2, wherein said piston bottom has an inverted V-shaped configuration complemental to the inverted V-shaped configuration of said cylinder head.

9. The diesel engine as defined in claim 2, wherein said piston bottom has an indentation.

10. The diesel engine as defined in claim 9, wherein said indentation is dish-shaped.

11. The diesel engine as defined in claim 9, wherein said indentation has an essentially circular-cylindrical shape.

12. The diesel engine as defined in claim 9, wherein said indentation has a level bottom surface.

13. A diesel engine as defined in claim 9, wherein said indentation has an indentation axis extending along said cylinder axis and said injection nozzle has an axis coinciding with an axis of said injection nozzle.

14. The diesel engine as defined in claim 9 wherein said indentation has an axis which is offset relative to said nozzle axis toward said exhaust valve.

* * * * *